(12) United States Patent
Dreossi et al.

(10) Patent No.: US 10,117,559 B2
(45) Date of Patent: Nov. 6, 2018

(54) ARRANGEMENT FOR PROVIDING A WASH ZONE

(71) Applicant: ELECTROLUX APPLIANCES AKTIEBOLAG, Stockholm (SE)

(72) Inventors: Giuseppe Dreossi, Stockholm (SE); Per-Erik Pers, Järfälla (SE); Bartosz Dawidiak, Stockholm (SE); Maciej Zienkiewicz, Stockholm (SE); Finn Svensson, Stockholm (SE)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 15/037,525

(22) PCT Filed: Dec. 20, 2013

(86) PCT No.: PCT/EP2013/077770
§ 371 (c)(1),
(2) Date: May 18, 2016

(87) PCT Pub. No.: WO2015/090462
PCT Pub. Date: Jun. 25, 2015

(65) Prior Publication Data
US 2016/0287047 A1    Oct. 6, 2016

(51) Int. Cl.
*A47L 15/00*    (2006.01)
*A47L 15/23*    (2006.01)
(Continued)

(52) U.S. Cl.
CPC ....... *A47L 15/0028* (2013.01); *A47L 15/0007* (2013.01); *A47L 15/0047* (2013.01);
(Continued)

(58) Field of Classification Search
CPC ................ A47L 15/4282; A47L 15/00–15/508
See application file for complete search history.

(56) References Cited

U.S. PATENT DOCUMENTS

| 4,174,723 A | 11/1979 | Long |
| 6,239,416 B1 | 5/2001 | Nomura et al. |

(Continued)

FOREIGN PATENT DOCUMENTS

| CN | 1 117 601 A | 2/1996 |
| DE | 12 91 869 B | 4/1969 |

(Continued)

OTHER PUBLICATIONS

Machine Translation of DE1291869B (Year: 1969).*
(Continued)

*Primary Examiner* — Spencer E Bell
(74) *Attorney, Agent, or Firm* — Alston & Bird LLP

(57) ABSTRACT

Provided herein is an arrangement for creating a wash zone with in a dishwasher washing chamber. The arrangement may include a spray arm may rotate around an axis; a water pump may feed water to the spray arm; and a support element may rotatably support the spray arm in the washing chamber. The support element may lock the spray arm in at least one position when the pressure in the water fed from the water pump via the support element to the spray arm exceeds a predetermined level. The arrangement may include a control unit arranged to control the operation of the water pump. The control unit may increase the pressure in the water fed from the water pump to the spray arm to lock the spray arm and thereby create the wash zone. A dishwasher including the arrangement and a method for controlling the dishwasher are also provided.

14 Claims, 4 Drawing Sheets

(51) Int. Cl.
*A47L 15/42* (2006.01)
*A47L 15/50* (2006.01)

(52) U.S. Cl.
CPC ........... *A47L 15/23* (2013.01); *A47L 15/4221* (2013.01); *A47L 15/502* (2013.01); *A47L 15/507* (2013.01); *A47L 15/4282* (2013.01); *A47L 2401/14* (2013.01); *A47L 2501/05* (2013.01); *A47L 2501/20* (2013.01)

(56) References Cited

U.S. PATENT DOCUMENTS

| | | | |
|---|---|---|---|
| 6,263,888 B1 | 7/2001 | Nomura et al. | |
| 2003/0168087 A1 | 9/2003 | Inui et al. | |
| 2004/0103929 A1 | 6/2004 | Ha | |
| 2009/0178698 A1 * | 7/2009 | Delgado | A47L 15/22 134/57 D |
| 2012/0097199 A1 | 4/2012 | Tuller | |
| 2012/0097200 A1 | 4/2012 | Fountain | |
| 2012/0138110 A1 | 6/2012 | Chen et al. | |
| 2013/0139854 A1 | 6/2013 | Lee et al. | |
| 2013/0284216 A1 * | 10/2013 | Forster | A47L 15/23 134/179 |

FOREIGN PATENT DOCUMENTS

| | | | | |
|---|---|---|---|---|
| DE | 1291869 B * | 4/1969 | | A47L 15/23 |
| DE | 10 2012 217 568 A1 | 3/2013 | | |
| EP | 1040786 A1 * | 10/2000 | | A47L 15/4282 |
| EP | 1 238 622 A2 | 9/2002 | | |
| EP | 2 030 556 A1 | 3/2009 | | |
| GB | 2 253 341 A | 9/1992 | | |
| JP | 2009-273490 A | 11/2009 | | |
| WO | WO 2013/132458 A1 | 9/2013 | | |

OTHER PUBLICATIONS

Office Action European Patent Application No. 13819035.0 dated May 22, 2017.
Written Opinion for International Application No. PCT/EP2013/077768 dated Oct. 30, 2014, 5 pages.
Written Opinion for International Application No. PCT/EP2013/077769 dated Sep. 11, 2014, 8 pages.
Written Opinion for International Application No. PCT/EP2013/077770 dated Oct. 28, 2014, 6 pages.
Restriction Requirement from U.S. Appl. No. 15/037,523 dated Oct. 6, 2017, 9 pages.
Office Action from U.S. Appl. No. 15/037,529, dated Jul. 19, 2017, 18 pages.
International Search Report for International Application No. PCT/EP2013/077768 dated Oct. 30, 2014.
International Search Report for International Application No. PCT/EP2013/077769 dated Sep. 11, 2014.
International Search Report for International Application No. PCT/EP2013/077770 dated Oct. 28, 2014.
Final Office Action for U.S. Appl. No. 15/037,529 dated Nov. 22, 2017, 18 pages.
English Translation of Russian Office Action No. 2016129427 dated Nov. 23, 2017, 2 pages.
Office Action for U.S. Appl. No. 15/037,523 dated Dec. 29, 2017, 16 pages.
Notice of Allowance for U.S. Appl. No. 15/037,529 dated Feb. 14, 2018, 12 pages.
Office Action for Chinese Application No. 201380081532.6 dated May 10, 2018, 8 pages.
Notice of Allowance for U.S. Appl. No. 15/037,523 dated May 16, 2018, 10 pages.

* cited by examiner

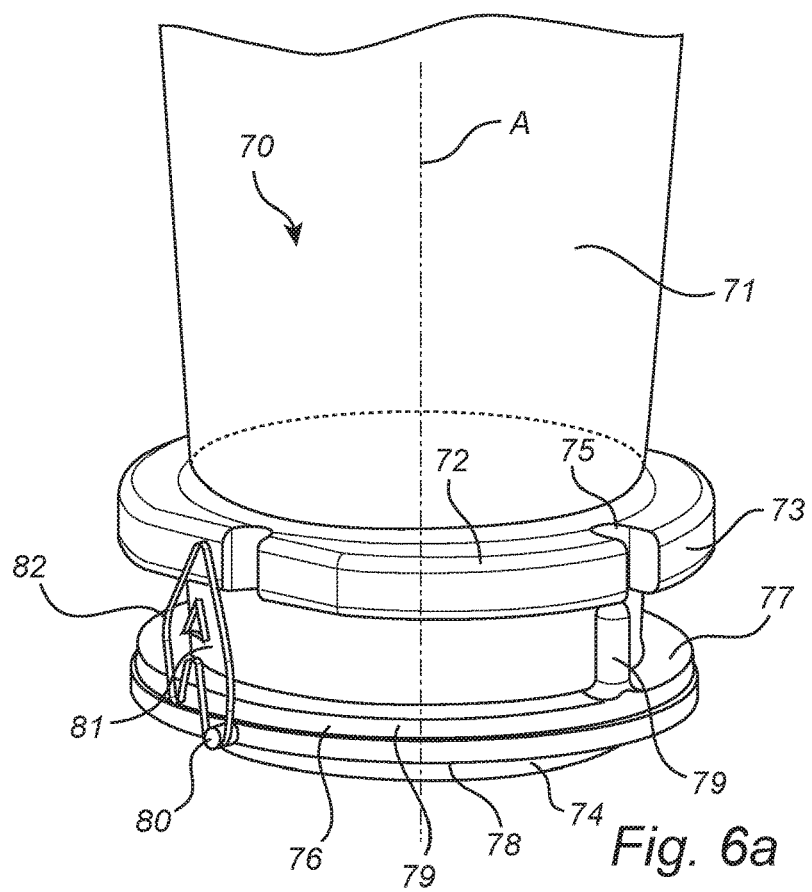
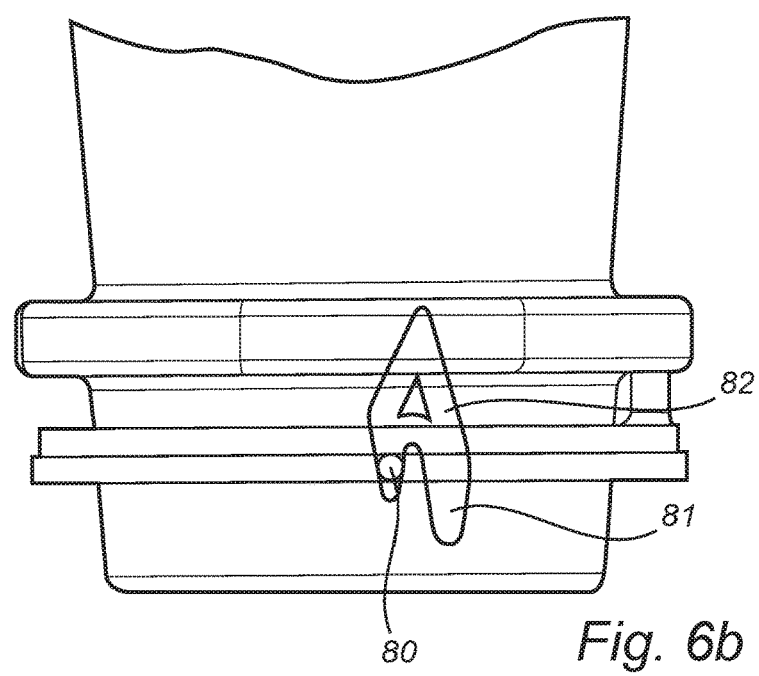

ARRANGEMENT FOR PROVIDING A WASH ZONE

CROSS-REFERENCE TO RELATED APPLICATIONS

This application is a national stage application filed under 35 U.S.C. § 371 of International Application No. PCT/EP2013/077770 filed Dec. 20, 2013, which application is hereby incorporated by reference in its entirety.

FIELD OF THE INVENTION

The present invention relates to an arrangement for providing a wash zone with intensified washing in a dishwasher washing chamber, a dishwasher comprising said arrangement and a method for controlling a dishwasher comprising said arrangement.

BACKGROUND OF THE INVENTION

Dishwashers are frequently used in domestic kitchens as well as professional kitchens and restaurants for dishing goods such as for example plates, pots, pans etc. Dishwashers comprises a washing chamber in which the dishing goods are packed in one or more baskets to remain in the intended position separated from adjacent items to make it possible for water to circulate within the washing chamber and clean the dishing goods.

Water is circulated in the washing chamber by a pump arranged in the lower section of the washing chamber. The water is lead from the pump via pipes to one, or more, rotating spray arms provided with a number nozzles that are spraying water on the dishing goods to clean the dishing goods.

In order to adapt the dishwasher to new regulations regarding reduced energy consumption as well as reduced water consumption modern dishwashers have been provided with one or more wash zones, i.e. a selected area within the washing chamber where the amount of water sprayed on the dishing goods is higher compared to the rest of the washing chamber. Thereby more dirty dishing goods requiring more intense washing could be arranged in the wash zone where the washing is more intense. The increased flow of water is provided either by adding additional nozzles on the inside wall of the washing chamber alternatively adding nozzles on the spray arm to direct more water towards the wash zone and thereby optimizing the process and reduce the power consumption and/or water consumption. One example of dishwasher with the described arrangement is disclosed in US2012/0138110. The dishwasher comprises at least one auxiliary spray nozzle arranged on the side wall of a treating chamber to intensify the spraying of water on dishing goods arranged in a selected part of a basket within the treating chamber.

The disclosed wash zone arrangement unfortunately requires a number of additional components which makes them expensive and complicated. There is consequently a need for an arrangement that provides the desired wash zone but is less complicated, and less expensive to manufacture.

SUMMARY OF THE INVENTION

The present invention, defined in the appended claims, relates to an arrangement for providing a wash zone with intensified cleaning in a dishwasher washing chamber that to at least some extent fulfils the needs defined above. The invention furthermore relates to a dishwasher comprising said arrangement.

The arrangement according to the invention comprises:
- a spray arm arranged to rotate around an axis A;
- a water pump arranged to feed water to the spray arm;
- a support element arranged to rotatably support the spray arm in the washing chamber, said support element is arranged to lock the spray arm in at least one position within the washing chamber when the pressure in the water fed from the water pump via the support element to the spray arm exceeds a predetermined level; and
- a control unit arranged to control the operation of the water pump, wherein the control unit is arranged to increase the pressure in the water fed from the water pump to the spray arm to lock the spray arm and thereby create the wash zone.

The claimed arrangement fulfils the needs defined above since a wash zone is created by increasing the pressure in the fed water to stop the rotation of the spray arm such that the water sprayed from the satellite spray device is focused to a zone of the washing.

The claimed arrangement is very favourable since the wash zone is created without adding a lot of components such as further nozzles and/or pipes for feeding the nozzles which reduces the costs for the wash zone arrangement considerably. Furthermore, the arrangement is very simple which reduces the risk for damages and failure of the arrangement.

In one embodiment of the arrangement, the support element comprises a first and a second element that are rotatably arranged in relation to each other when the pressure from the water pump is below the predetermined level and locked to each other when the pressure is raised above the predetermined level. This is one embodiment of a support element that provides the desired function of the arrangement and still provides a simple and reliable arrangement.

In one embodiment of the arrangement, the first element is stationary arranged in the washing chamber and the second element arranged to rotate with the spray arm, said second element is movably arranged along the axis A in relation to the first element between a first position in which the second element is rotatable around the axis A and a second position in which the spray arm is prevented from rotating, said second element is moved from the first position to the second position when the pressure is raised above the predetermined level. This embodiment of the support element provides a reliable stopping and releasing of the spray arm in the washing chamber.

In one embodiment of the arrangement, the control unit controls the water pump by increasing or reducing the speed of the pump to stop and start the rotation of the spray arm.

In one embodiment of the arrangement, corresponding male/female coupling means are arranged on the first and second element to stop rotation of the spray arm when the second element is in the second position. This embodiment is favourable since the male/female coupling means provides a simple and reliable stop for the spray arm as long as the second element is kept in the second position.

In one embodiment of the arrangement, the first element comprises a pipe extending coaxially to the axis A and ended by an annular flange extending first in radial direction outwards from the upper end of the pipe and a outer end curved downwards, and the second element comprises a pipe-shaped protrusion with an outside diameter corresponding to the inner diameter of the pipe and arranged within the pipe, said second element furthermore comprising a second flange with a first part extending radially outwards from the pipe-shaped protrusion outside the annular flange of the first element and a second section extending coaxially to the pipe shaped protrusion downwards from the outer end of the first section to enclose the annular flange of the first section and in the end provided with gripping means to secure the second element to the first element, wherein the length of the second section exceeds the length of the curved outer end of the first element such that the first and second element are movable in relation to each other along the axis A. This embodiment of the arrangement provides a support element that could be produced and assembled in an efficient way and ensure the desired function of the arrangement.

In one embodiment of the arrangement, a cut out portion is formed in the curved outer end of the first element, and a protrusion fitting in the cut out portion arranged on the inside surface of the enclosing second section such that the second element is stopped from rotation around axis A when the second element is moved to the second position and the protrusion fitted in the cut out portion. This embodiment of the arrangement provides a support element that ensures the required axial movement and male/female coupling means that stops the spray arm once the second element and spray arm are lifted to the second position and the male part fitted in the female part.

In one embodiment of the arrangement, the cut out portion and the protrusion are positioned such that the satellite spray device is positioned in the intended position for the wash zone when the second element is moved to the second position and the protrusion fitted in the cut out portion.

In one embodiment of the arrangement, the water is lead along the axis A in the first element of the support element and redirected substantially 90° to continue in the spray arm. This embodiment of the arrangement ensures the desired function of the arrangement since the spray arm is arranged transverse to the axis A which facilitates the couplings between the different components of the arrangement.

In one embodiment of the arrangement, the second element is arranged in the centre of the spray arm and the water flow divided to flow in both directions substantially opposite to each other within the spray arm to provide the desired flow of water in the spray arm and from nozzles arranged on the spray arm. This embodiment furthermore results in a substantially equal load distribution within the spray arm since the arm is supported in the centre.

In one embodiment of the arrangement, a redirecting surface is arranged in the water flow along axis A, said surface is redirecting the water and generating the force that moves the second element from the first to the second position when the pressure is increased. The redirecting surface facilitates the water flow and generates the required force in the axial direction to move the second element from the first to the second position.

The invention furthermore relates to a method creating a wash zone in a washing chamber of a dishwasher comprising: a spray arm rotatable around an axis A; a water pump arranged to feed water to the spray arm; a support element arranged to rotatably support the spray arm in the washing chamber, said support element is arranged to lock the spray arm in at least one position within the washing chamber when the pressure in the water fed from the water pump via the support element to the spray arm exceeds a predetermined level; and a control unit arranged to control the operation of the water pump; wherein the method comprises the steps:
 a) running the pump at a first speed to feed water to the spray arm at a pressure below the predetermined value;
 b) increasing the speed of the pump to deliver water at a pressure exceeding the predetermined level and stop the rotation of the spray arm to create the wash zone;

The method according to the invention provides a very simple, reliable and efficient solution to create a wash zone in a dishwasher without adding a lot of components that increases the complexity of the dishwasher.

The different embodiment described above could of course be combined and modified in different ways without departing from the scope of the invention that will be described more in detail in the detailed description.

BRIEF DESCRIPTION OF THE DRAWINGS

One embodiment of a dishwasher and selected components of the arrangement according to the invention is illustrated in the appended figures.

FIGS. 6*a* and 6*b* discloses selected parts of a second embodiment of a support element.

DETAILED DESCRIPTION

Figure 1:
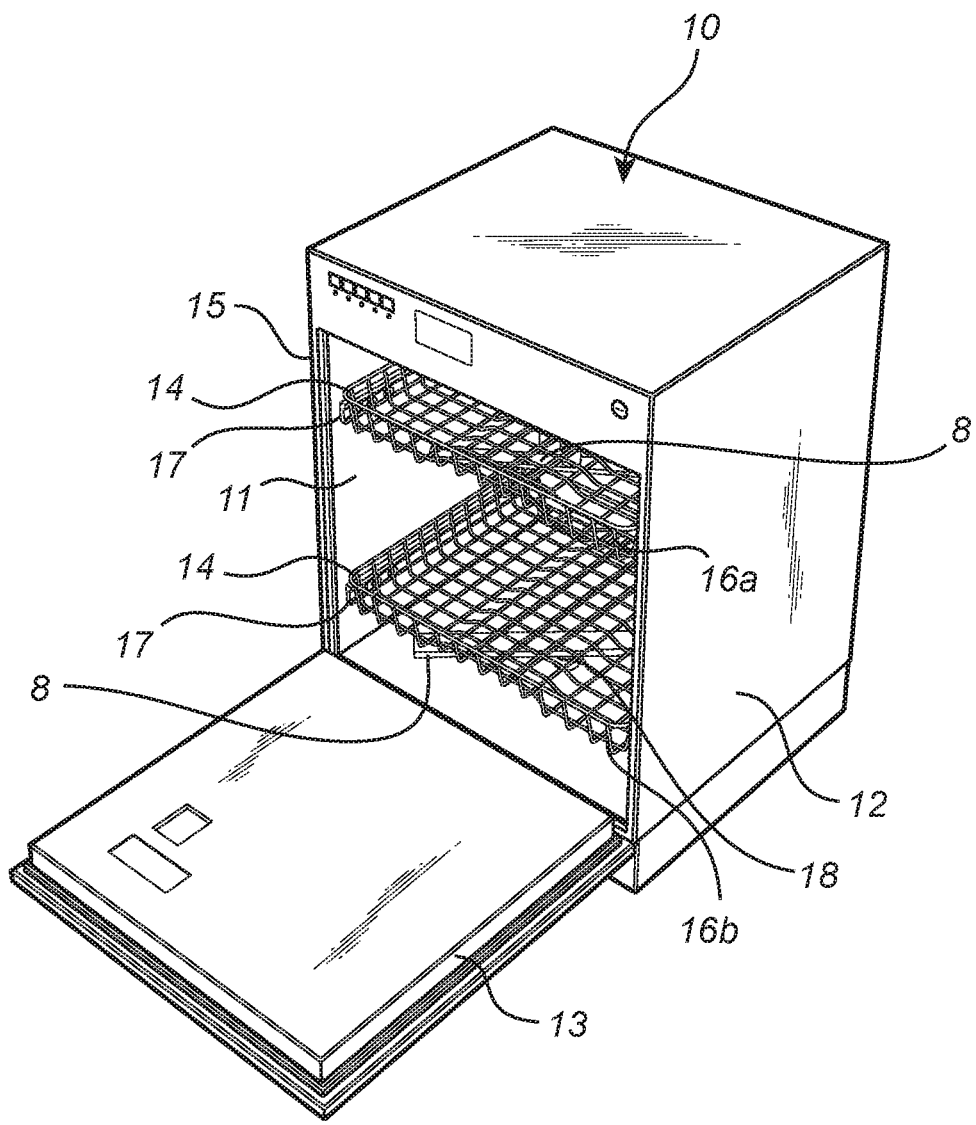
FIG. 1 discloses a schematic perspective view of a dishwasher.

In FIG. 1, a perspective schematic view of dishwasher 10 is illustrated. The dishwasher comprise a washing chamber 11 surrounded by a substantially rectangular cabinet 12. The washing chamber 11 comprises an opening 15 in the front side of the dishwasher in order to make the washing chamber 11 accessible during loading and unloading of items in and from the washing chamber. The opening 15 is closed by a door 13 in order to make it possible to access, and close, the opening 15 of the washing chamber 11. Within the washing chamber 11, an upper 16*a* and lower basket 16*b* for dirty items are arranged at different heights. The baskets are extractably arranged in the washing chamber and formed of thin elements like for example wires or rods in order to provide a basket structure that the water could flow through easily. The dishwasher 10, illustrated in FIG. 1, comprises two wire baskets 16 arranged on guide rails 17. The lower one is normally used for larger dishing goods like plates, pots etc, and the upper one for cups, glasses and smaller items. The number of baskets could however be increased further to comprise for example a third basket for small dishing goods and cutleries arranged in the top of the washing chamber.

Heated water, in combination with detergent, is circulated in the washing chamber by a water circulating system comprising at least a water pump 19 arranged in the lower part of the washing chamber, i.e. the sump, where water is collected and recirculated within the washing chamber. The water pump 19 is connected to at least one rotating spray arm 8 arranged in the washing chamber 11.

Figure 2:
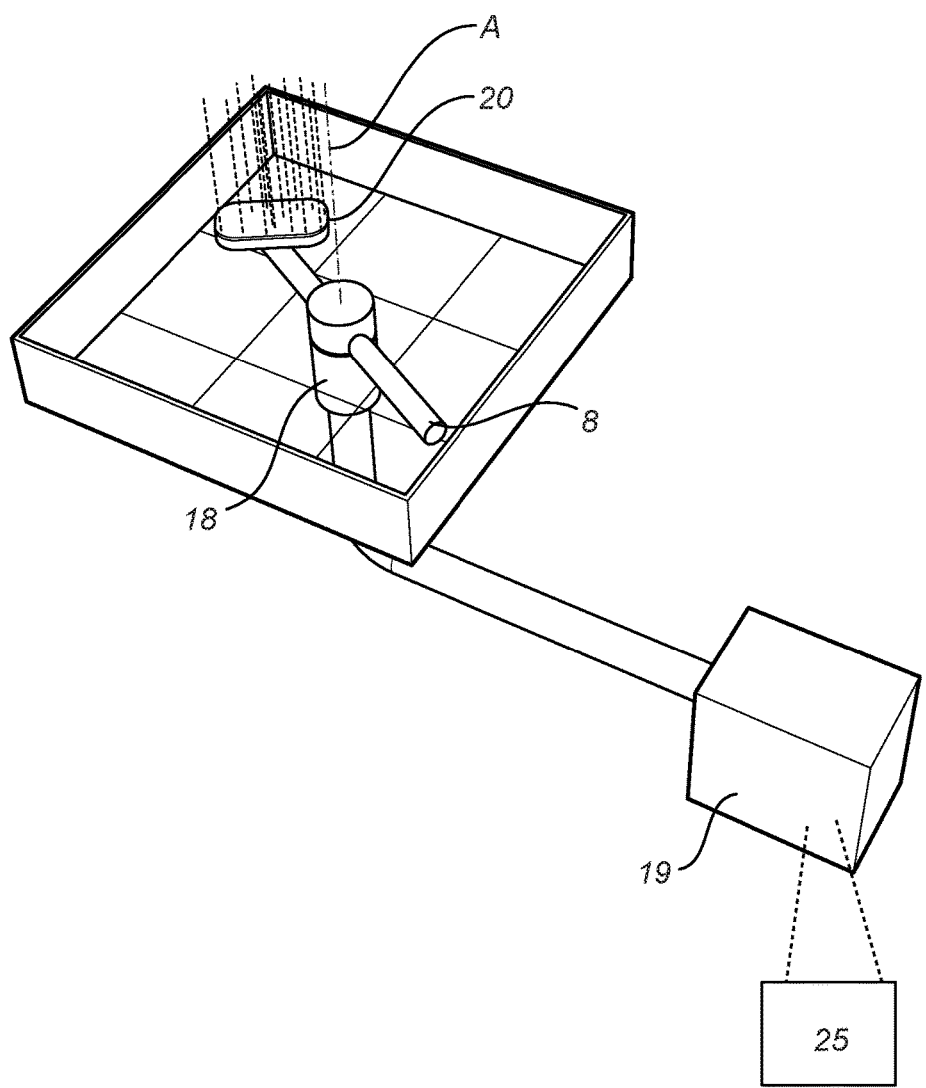
FIG. 2 discloses a spray arm schematically.

The spray arms 8, schematically illustrated in FIG. 2, are rotatably supported by a support element 18 and arranged to rotate around a substantially vertical axis A in the centre of the washing chamber 11 such that each spray arm 8 is rotating in a substantially horizontal plane within the washing chamber 11. Depending on the size and design of the dishwasher 10 the spray arm is either arranged to rotate under a basket, or in an elevated position above the basket. However, dishwashers could be provided with several spray arms arranged at different heights within the washing chamber.

The spray arm 8 has an elongated shape to cover as large area as possible within the washing chamber 11 when it rotates to ensure that all dishing goods packed in the basket are washed. The spray arm 8 is rotatably supported close to the centre of the elongated spray arm by a support element 18 secured in the dishwasher to provide the required support for the spray arm 8. Water is fed from the pump 19 via the support element to 18 the spray arm 8. In one end of the spray arm 8 a satellite device 20 is rotatably secured, illustrated schematically in FIG. 2. The satellite spray device 20 is on its upper side provided with a number of nozzles to spray water on the dishing goods in a basket above the spray arm when water is supplied from the pump. The illustrated satellite device is an elongated bar but the shape could be modified in several ways such as for example as substantially circular. The satellite device 20 improves the spraying characteristics and the cleaning since more water is sprayed on the dishing goods in the area of the satellite device 20. Both the spray arm 8 and the satellite device 20 are rotated by the forces generated from nozzles arranged on the spray arm and the satellite device when water is fed from the pump under pressure. Some of the nozzles on the spray arm and/or the satellite device are directed and dedicated to generate the required rotational force.

The wash zone where intense washing is provided is generated by locking the spray arm 8 in a predetermined position for the wash zone. The spray arm 8 is locked for a predetermined period of time depending on the selected operation program. During this period of time the spray arm 8 is stopped and water sprayed continuously from the nozzles on the spray arm 8, and the rotating satellite device 20 to spray water on the dishing goods packed in the wash zone.

The rotation of the spray arm 8 is stopped by the support element 18 when the pressure in the water fed from the water pump 19 to the spray arm 8 via the support element 18 is raised above a predetermined level.

Figures 3, 4:
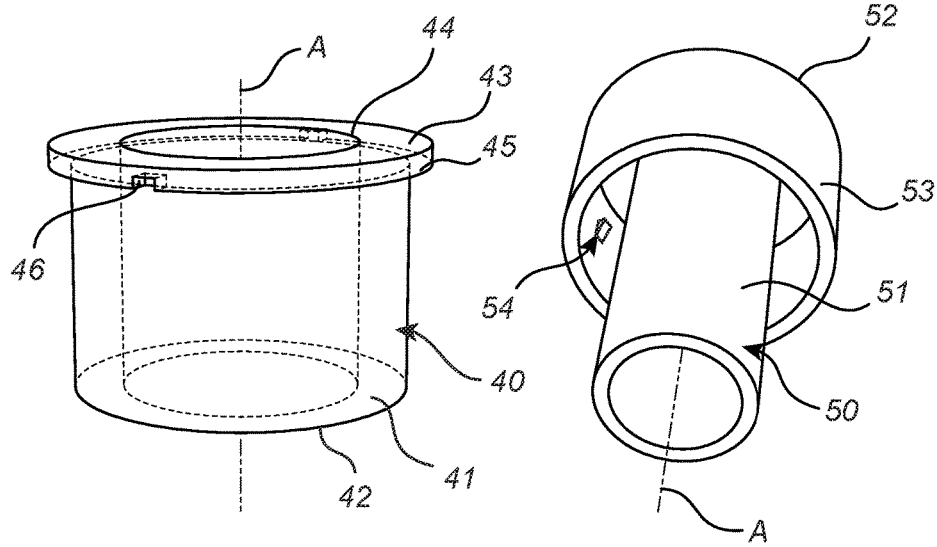
FIG. 3 discloses a perspective view of the first element of the support element.
FIG. 4 discloses a perspective view of the second element of the support element.
Figures 5A, 5B:
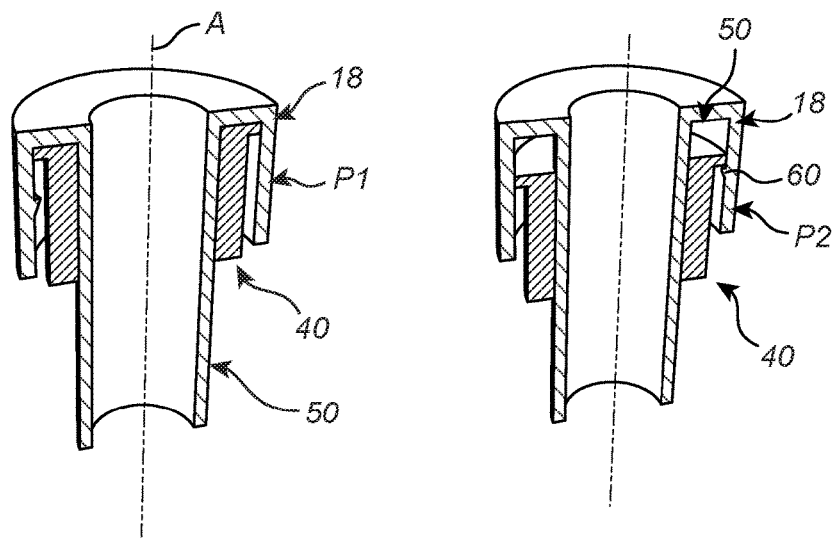
FIGS. 5*a* and 5*b* discloses the support element with the second element in the first respective second position.

In order to make it possible to lock the spray arm 8, the support element 18 comprises a first element 40 illustrated in FIG. 3, and a second element 50 illustrated in FIG. 4. The first and second elements fitted to each other are illustrated in FIGS. 5*a* and 5*b*.

The first element 40 is stationary arranged in the washing chamber and the second element 50 movable between a first and second position along the axis A. When the second element is in the first position, illustrated in FIG. 5*a*, the second element is free to rotate around the axis A, and when the second element is in the second position, vertically elevated in relation to the first position and illustrated in FIG. 5*b*, the second element is locked in relation to the first element and the spray arm prevented from rotating around the axis A.

The second element is initially arranged in the first position either by gravity, or a combination of gravity and a spring, arranged to hold the second element in the first position. The second element is moved between the first and second position by the force generated from the pressurised water supplied to the spray arm 8 via the support element 18 since the water is supplied in a direction substantially parallel to the axis A from the lower part of the washing chamber upwards to the support element 18 and the spray arm 8 where the water is redirected substantially 90° by a redirection surface in the support element or the spray arm, not illustrated, to continue towards both ends of the spray arm 8 and the satellite device 20. The pressurised flow of water generate a force on the redirection surface and when the pressure from the supplied water exceeds a predetermined value required to lift the second element 50 and the spray arm 8 to the second position and the second element 50 locked in relation the first element 40.

The described function of the support element 50 is achieved with the first 40 and second element 50 in FIGS. 3 and 4. The first element comprises an elongated pipe 41 arranged coaxially with the rotational axis A. The pipe has a lower end 42 intended to be connected to the water supply pipe from the pump, and an upper end of the pipe 41 ended by an annular flange 43 extending first in a substantially radial direction outwards from the upper end 44 of the pipe 41. From the outer end of the radially extending flange 43 an end section 45 extends downwards.

The second element comprises a pipe-shaped protrusion 51 with an outside diameter corresponding to the inner diameter of the pipe 41 of the first element 40 and intended to be arranged within the pipe 41 of the first element 40. The second element 50 furthermore comprises a second flange 52 with a first part extending radially outwards from the pipe-shaped protrusion 51 outside the annular flange 43 of the first element 40, and a second section 53 extending coaxially to the pipe shaped protrusion 51 downwards from the outer end of the first section to enclose the annular flange 43 of the first section 40.

The length of the second section 53 of the second element 50 exceeds the length of the downwards extending end section 45 of the first element 40 such that the first 40 and second 50 elements are movable in relation to each other along the axis A.

When the pressure from the fed water exceeds the predetermined level and the second element 50 in moved to the second position P2 corresponding male/female coupling means 60 arranged on the first and second element are connected to each other and the rotation of the spray arm stopped The male/female coupling means could be embodied as a cut out portion 46 formed in the downwards extending outer end 45 of the first element 40, and a corresponding protrusion 54 with a shape and size corresponding to the cut out portion in the first element 40 arranged on the inside surface of the enclosing second section 53 such that the second element 50 is stopped from rotation around axis A.

Once the pressure exceeds the predetermined level, the second element will continue its rotation until the position of the protrusion 54 corresponds to the position of the cut out portion 46 and the male/female members could be fitted to each other. The cut out portion 46 and the protrusion 54 are positioned such that the satellite spray device 20 is positioned in the intended position for the wash zone when the second element 50 is moved to the second position P2 and the protrusion 54 fitted in the cut out portion 46.

However, the spray arm could be locked in the intended position in several different ways and in FIGS. 6*a* and 6*b* selected parts of an alternative second embodiment of a support element are illustrated. In FIG. 6*a*, the lower part of a pipe-shaped protrusion 71 of a second element 70 is illustrated. The pipe-shaped protrusion 71 is intended to extend down into a corresponding pipe of a first element stationary arranged in the washing chamber, not illustrated. Close to the lower end 74 of the pipe-shaped protrusion 71 an annular support flange 72 extends in radial direction from the pipe-shaped protrusion 71 outwards. The outer surface 73 of the support flange 72 provides support against the inner surface of the first element. At least one recess 75 is arranged in the support flange 72, Below the support flange 72 a locking ring 76 is movably arranged along the axis A and the lower end 74 of the pipe-shaped protrusion 71 between a first position in which the second element 70 and the spray arm 8 is free to rotate, and a second position in which the second element 70 and the support arm 8 is prevented from rotation.

The locking ring 76 has a first side 77 facing the support flange 72 and a second side 78 arranged on the opposite side of the locking ring 76 and facing downwards. From the first side a locking pin 79 extends substantially parallel to axis A. The locking pin has a shape, size and length corresponding to the recess 75 in the support flange to fit in the recess 75 when the locking ring is moved to the second position and thereby lock the second element 70 in the intended position and stop the rotation of the spray arm 8.

The locking ring 76 furthermore comprises a radially extending knob 80 which in combination with a guiding element 81 and a corresponding not illustrated securing element on the inside surface of the first element 40. The securing element maintains the guiding element in the intended position and prevents rotation of the locking ring 76 within the first element 40.

The guiding element 81 is intended to control the movement of the locking ring along axis A and has an inner guiding structure 82 defining the allowable path and movements for the knob 80 in relation the guiding element and the first element 40. The guiding structure 82 has the general shape of the letter A arranged with the narrow end arranged upwards. The distance from the narrow top to the lower end of respective side of the A shaped guiding structure is however different at the different sides of the A shaped guiding structure.

The movement of the locking ring is achieved and controlled by changing the pressure in the water fed from the pump 19 to the spray arm corresponding to the description above since the supplied water is pressing against the lower second side 78 of the locking ring 76 and when the pressure exceeds a predetermined required pressure the locking ring 76 is moved upwards towards the support flange 72.

When the spray arm is free to rotate the locking ring 72 is arranged in the first position and the knob 80 is arranged in the lowest possible position within the guiding structure 82, i.e. the longest side (right side in FIGS. 6a and 6b) of the A shaped guiding structure 72, illustrated in FIG. 6a. When the pressure exceeds the predetermined value and the locking ring 72 starts to move, the knob 80 is moved from the position where the knob 80 is in the lower end of the guiding structure 82 to the narrow top which means that the locking pin 79 is fitted in the recess 75 to prevent rotation of the second element 70 and the spray arm 8.

Once the rotation of the second element 70 has been stopped the pressure in the water could be reduced since the shape of the guiding structure forces the knob 80 to move downwards along the other shorter section (left side in FIGS. 6a and 6b) to a position where the knob rests in the lower end of the guiding structure 82, illustrated in FIG. 6b). Even though the locking ring has moved a distance along axis A, the locking pin 79 is still fitted in the recess 75 and the second element prevented from rotation. When the time period for the desired wash zone is ended, the pressure in the water is once again increased to exceed the predetermined value to lift the locking ring. During this movement of the locking ring the knob 80 moves along the horizontal passage of the A-shaped section to the other longer section of the guiding structure 82 such that the locking ring 72, when the pressure in the water is reduced, is able to move downwards in order to release the locking pin 79 from the recess 75 and start the rotation of the spray arm 8. The described embodiment reduces the loads on the pump 19 since the speed of the pump could be reduced once the rotation of the spray arm is stopped.

The dishwasher operation is controlled by a control unit 25 arranged somewhere in the dishwasher 10. The control unit 25 operates the different functions and phases of the selected operation program of the dishwasher.

The control unit furthermore controls the operation of the water pump 19 and increases/reduces the speed of the water pump to activate/deactivate the wash zone during the operation of the dishwasher.

The invention furthermore relates to a method for controlling a dishwasher comprising an arrangement as the one described above for creating a wash zone with intensified washing in the washing chamber.

The embodiments described above could be combined and modified in different ways without departing from the scope of the invention that is defined by the appended claims.

The invention claimed is:

1. An arrangement for creating a wash zone in a washing chamber of a dishwasher, said arrangement comprising:
    a spray arm arranged to rotate around an axis (A);
    a water pump arranged to feed water to the spray arm;
    a support element arranged to rotatably support the spray arm in the washing chamber, said support element is arranged to lock the spray arm in at least one position within the washing chamber when the pressure in the water fed from the water pump via the support element to the spray arm exceeds a predetermined level, said support element comprises a first element and a second element that are rotatably arranged in relation to each other when the pressure from the water pump is below the predetermined level and engage each other when the pressure is raised above the predetermined level, wherein one of the first element and the second element is configured to be non-rotatable in the washing chamber and the other of the first element and the second element is arranged to rotate with the spray arm, said second element is movably arranged along the axis (A) in relation to the first element between a first position in which the other of the first element and the second element is rotatable around the axis (A) and a second position in which the spray arm is prevented from rotating, said second element is moved from the first position to the second position when the pressure exceeds the predetermined level; and
    a control unit arranged to control the operation of the water pump, wherein the control unit is arranged to increase the pressure in the water fed from the water pump to the spray arm to lock the spray arm and thereby create the wash zone.

2. The arrangement according to claim 1, wherein the first element is stationarily arranged in the washing chamber and the second element is arranged to rotate with the spray arm.

3. The arrangement according to claim 2, wherein corresponding male/female coupling means are arranged on the first and second element to stop rotation of the spray arm when the second element is in the second position.

4. The arrangement according to claim 3, wherein the first element comprises a pipe extending coaxially to the axis (A) and ended by an annular flange extending first in radial direction outwards from the upper end of the pipe and an outer end extending downwards, and the second element comprises a pipe-shaped protrusion with an outside diameter corresponding to the inner diameter of the pipe and arranged within the pipe, said second element furthermore comprising a second flange with a first part extending radially outwards from the pipe-shaped protrusion outside the annular flange of the first element and a second section extending coaxially to the pipe-shaped protrusion downwards from the outer end of the first section to enclose the annular flange of the first section, wherein the length of the second section exceeds the length of the outer end of the first element such that the first and second element are movable in relation to each other along the axis (A).

5. The arrangement according to claim 4, wherein a cut out portion is formed in the outer end of the first element, and a protrusion fitting in the cut out portion is arranged on the inside surface of the enclosing second section such that the second element is stopped from rotation around axis (A) when the second element is moved to the second position and the protrusion is fitted in the cut out portion.

6. The arrangement according to claim 5, wherein the cut out portion and the protrusion are positioned such that a satellite spray device rotatably arranged on the spray arm is positioned in an intended position for the wash zone when the second element is moved to the second position and the protrusion is fitted in the cut out portion.

7. The arrangement according to claim 1, wherein the control unit is arranged to control the water pump by increasing or reducing the speed of the pump and thereby stop and start the rotation of the spray arm.

8. The arrangement according to claim 1, wherein the water is lead along the axis (A) in the first element of the support element and redirected substantially 90° to continue in the spray arm.

9. The arrangement according to claim 1, wherein the spray arm comprises a satellite spray device rotatably arranged on the spray arm.

10. A dishwasher comprising the arrangement according to claim 1.

11. A method for creating a wash zone in a washing chamber of a dishwasher comprising the arrangement of claim 1; wherein the method comprises the steps:
a) running the pump at a first speed to feed water to the spray arm at a pressure below the predetermined value;
b) increasing the speed of the pump to deliver water at a pressure exceeding the predetermined level and stop the rotation of the spray arm to create the wash zone.

12. An arrangement for creating a wash zone in a washing chamber of a dishwasher, said arrangement comprising:
a spray arm arranged to rotate around an axis (A);
a water pump arranged to feed water to the spray arm at a first pressure and a second pressure, wherein the first pressure is greater than zero and the second pressure is greater than the first pressure;
a support element arranged on axis A to rotatably support the spray arm in the washing chamber, at least a portion of said support element configured to engage the water fed from the water pump to the spray arm such that said portion is configured to be lifted by the water at the second pressure and not lifted by the water at the first pressure, said support element is arranged to lock the spray arm in at least one position within the washing chamber when the water fed from the water pump via the support element to the spray arm is at the second pressure, and said support element is arranged to allow the spray arm to rotate when the water fed from the water pump via the support element to the spray arm is at the first pressure; and
a control unit arranged to control the operation of the water pump, wherein the control unit is arranged to increase the pressure in the water fed from the water pump to the spray arm from the first pressure to the second pressure to cause the spray arm to lock.

13. The arrangement according to claim 12, wherein at least a portion of the support element is configured to move from a first position, which allows the spray arm to rotate, to a second position, which locks the spray arm in the at least one position, in response to a force applied by the water fed from the water pump via the support element to the spray arm at the second pressure.

14. The arrangement according to claim 12, wherein the support element comprises a first element and a second element that are rotatably arranged in relation to each other when the pressure from the water pump is below the predetermined level and engage each other when the pressure is raised above the predetermined level.

* * * * *